Dec. 22, 1931.  W. J. McINNIS  1,837,467
MOTION PICTURE CAMERA
Filed Oct. 4, 1924  4 Sheets-Sheet 1

INVENTOR
Walter J. McInnis
BY
his ATTORNEY

Dec. 22, 1931.  W. J. McINNIS  1,837,467
MOTION PICTURE CAMERA
Filed Oct. 4, 1924    4 Sheets-Sheet 2

Dec. 22, 1931.  W. J. McINNIS  1,837,467
MOTION PICTURE CAMERA
Filed Oct. 4, 1924  4 Sheets-Sheet 3

INVENTOR
Walter J. McInnis
BY
ATTORNEY

Dec. 22, 1931.  W. J. McINNIS  1,837,467
MOTION PICTURE CAMERA
Filed Oct. 4, 1924   4 Sheets-Sheet 4
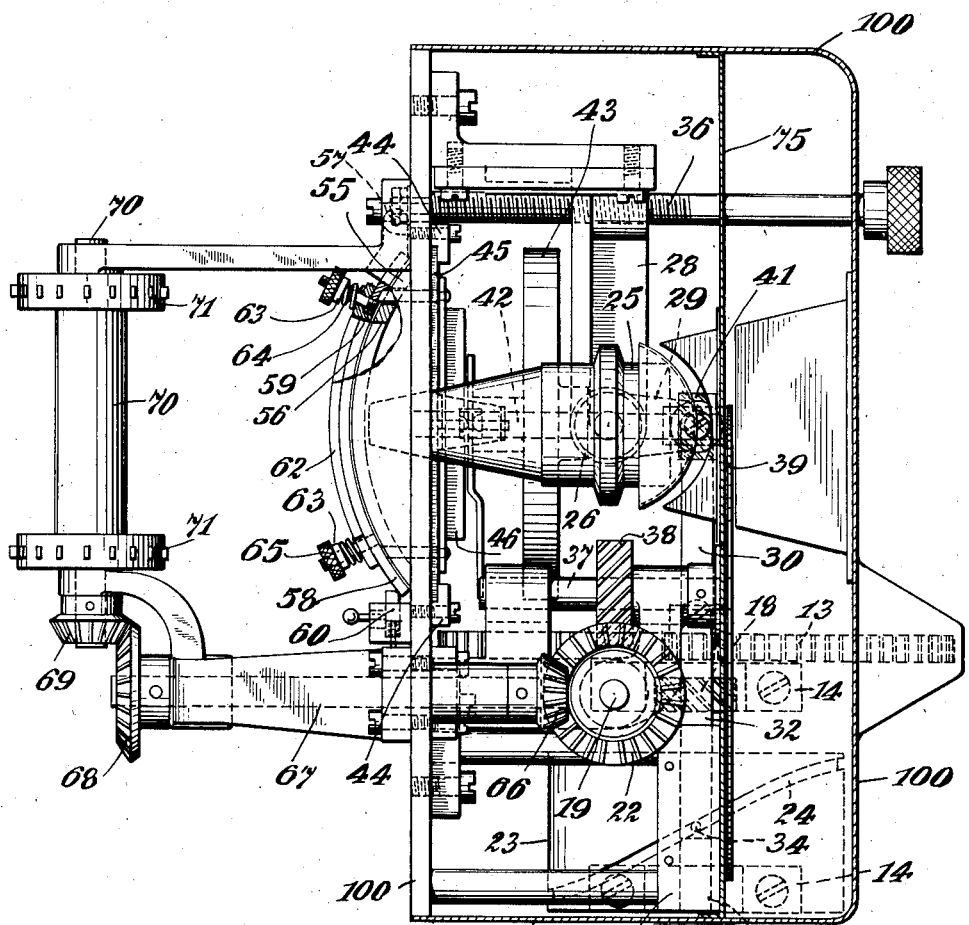
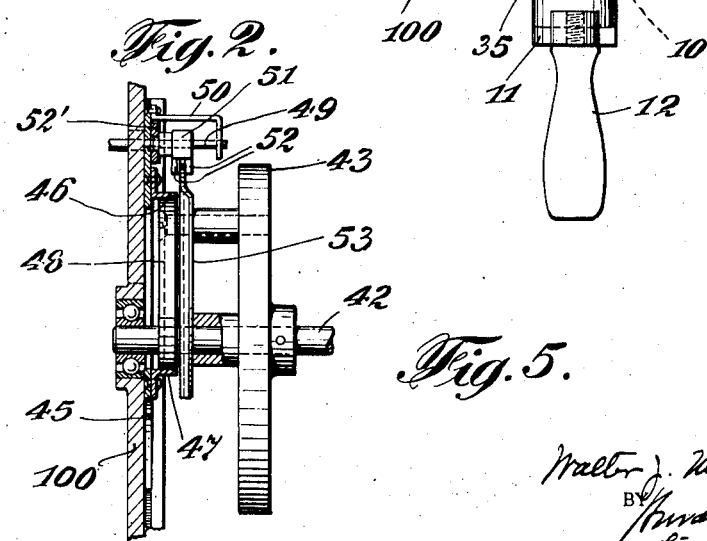
INVENTOR
Walter J. McInnis
BY
ATTORNEY Patented Dec. 22, 1931

1,837,467

UNITED STATES PATENT OFFICE

WALTER J. McINNIS, OF STELTON, NEW JERSEY, ASSIGNOR TO WIDESCOPE CAMERA COMPANY, OF NEWARK, NEW JERSEY, A CORPORATION OF NEW JERSEY

MOTION PICTURE CAMERA

Application filed October 4, 1924. Serial No. 741,629.

My invention relates to cameras and refers particularly to motion picture cameras.

In the usually employed motion picture cameras of the fixed single series of lens type, the visional angle is of limited scope, resulting in pictures covering a limited visual field. Hence, it is frequently necessary that the camera be placed a considerable distance from the objects to be photogaphed, thus causing a very considerable reduction in the size of the several objects within the field.

It is evident that much more valuable pictures could be obtained if the visual field of the camera could be extended, especially if this could be accomplished by the use of standard lenses. Further, it is evident, that the use of a single film for the production of such widescope pictures is more advantageous than the employment of a plurality of films as it insures ease and accuracy of projection.

I have found that valuable pictures of this character can be obtained by means of an oscillating lens pivotal upon its optical center, the lens during its exposed period producing photographic imprints of greater width than those produced by a fixed similar lens.

In order that clear photographic imprints may be made by motion picture cameras, it is necessary that the relation of the time of exposure to the time of non-exposure of the film be such that the parts of the camera must not move so rapidly as to cause vibration of the camera and unnecessary wear upon the moving parts. If the time of non-exposure is excessive as compared with that of exposure, it is evident that the parts must move very rapidly in order that the successive exposure periods may be such as to take satisfactory pictures of the moving objects, as otherwise the successive exposures will record movements of the objects so widely separated from each other as to cause unsatisfactory projections.

This rapid movement of the lens also has the undesirable and objectionable property of reducing the amount of light entering the camera during the exposure period, thus preventing the production of properly lighted pictures.

I have found that these, and other objectionable features, which are particularly noticeable in those cameras in which the lens has a complete revoluble movement, may be prevented by causing the lens to move with oscillating or forward and backward movement.

I have further found that the results obtained by an oscillating lens can be further enhanced by presenting the exposed portion of the film in a vertically curved position with its concave face toward the lens, thus allowing of a clear focusing completely across the film face during the lens oscillation.

In the accompanying drawings, illustrating one form of the device of my invention, similar parts are designated by similar numerals.

Figure 2 is a section through the line 2—2 of Figure 1.

Figure 5 is a section through the line 5—5 of Figure 4.

Figure 1:
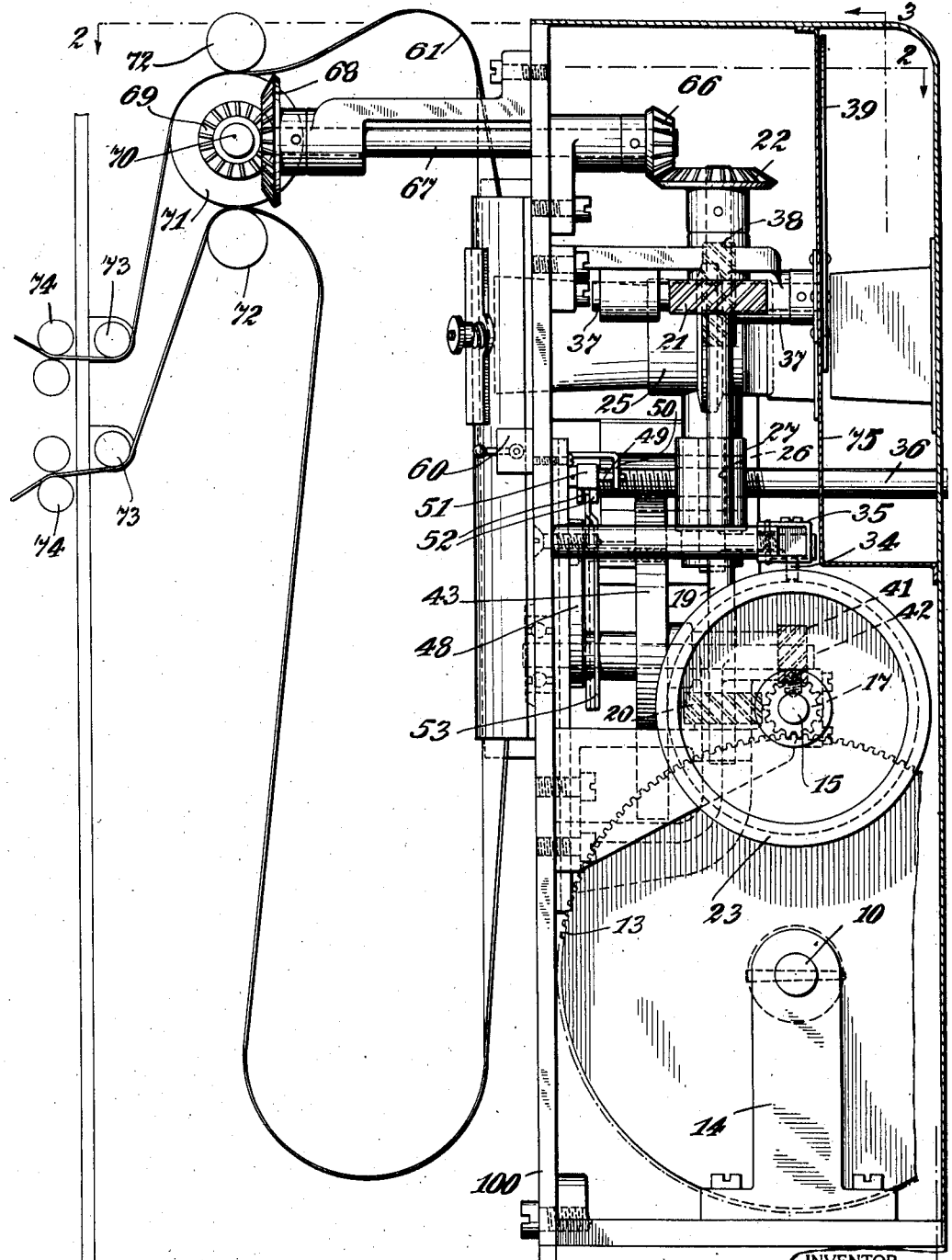
Figure 1 is a vertical side view of one form of the device of my invention.
Figure 3:
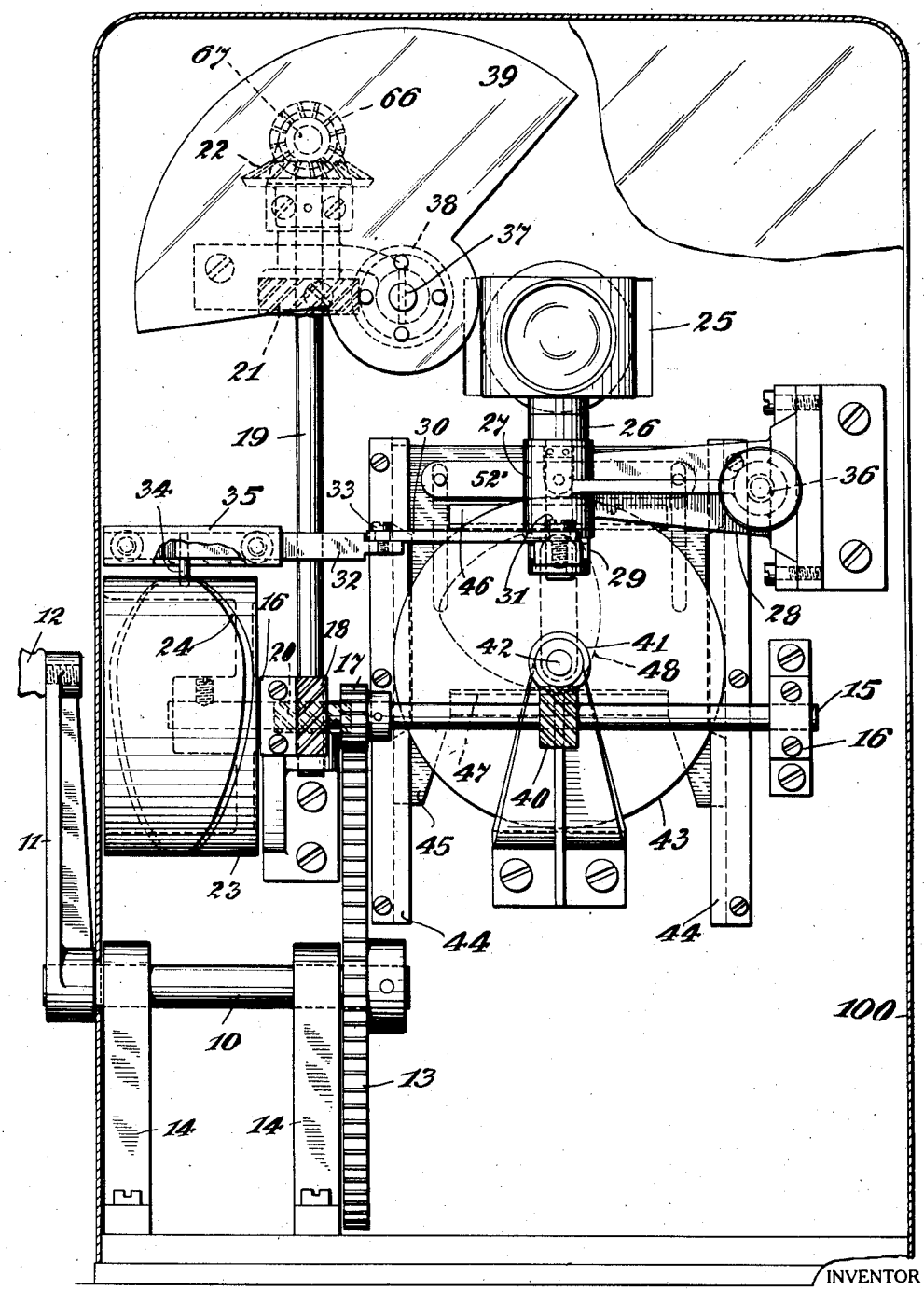
Figure 3 is a section through the line 3—3 of Figure 1.
Figure 4:
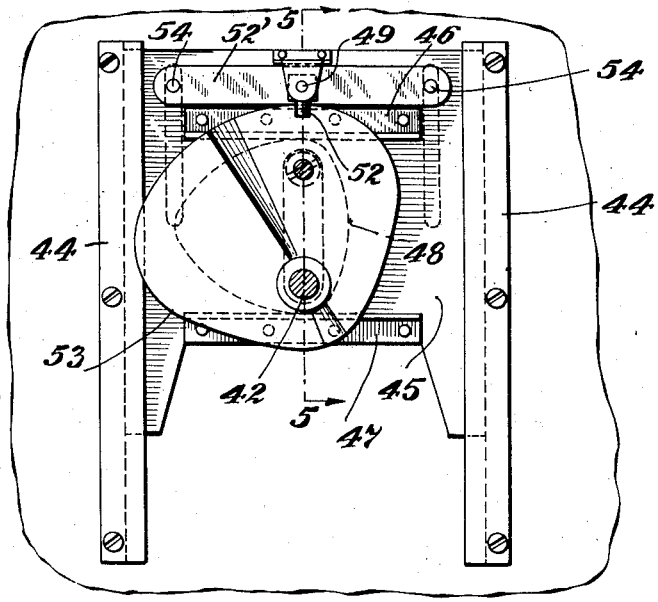
Figure 4 is a front view of the film moving mechanism.
Figure 6:
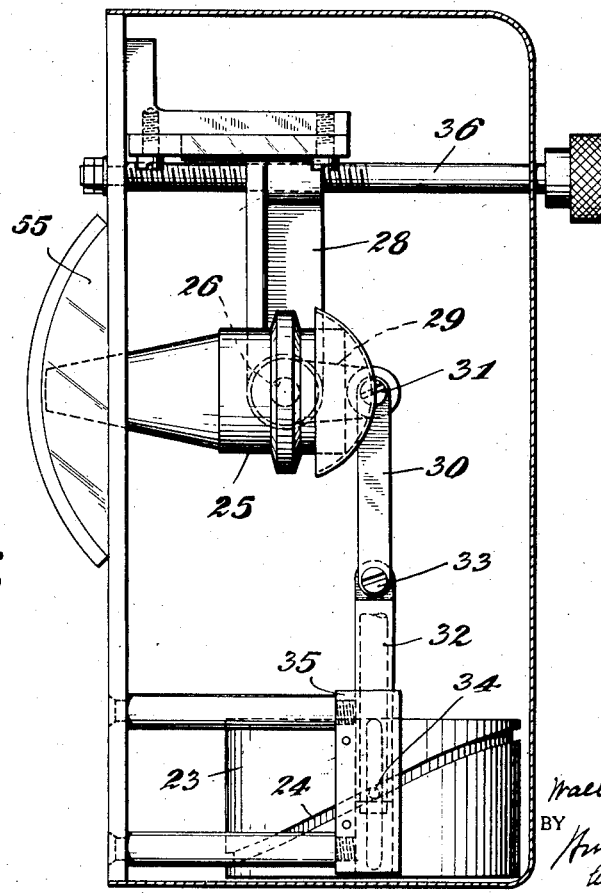
Figure 6 is a top plan view of the lens oscillating mechanism.

The particular form of the device of my invention shown in the accompanying drawings comprises a driving shaft 10 carrying the arm 11 having the handle 12, the other end of the shaft 10 carrying the gear wheel 13. The shaft 10 is supported by the brackets 14.14.

The revoluble shaft 15 supported within the bearings 16.16 has a fixedly attached gear wheel 17 meshing with the gear 13 of the shaft 10. The shaft 15 carries also the fixedly attached helical gear 18. The shaft 15 carries the fixedly attached cam drum 23 having the cam groove 24 therein.

The revoluble shaft 19 carries the fixedly attached helical gear 20 meshing with the helical gear 18, and also carries the fixedly attached helical gear 21 and the bevel gear 22.

A lens housing 25 containing suitable lenses is mounted upon the revoluble shaft 26 and hence is capable of an oscillating movement in a horizontal plane. The shaft 26 revolves within a bearing 27 carried by the arm support 28.

An arm 29 of the support 28 is pivotally connected with the link 30 at 31, and the link 30 is pivotally connected with the link 32 at 33. The link member 32 has a pin 34 capable of insertion within the cam recess 24 and is supported within the bearing 35. The revolution of the cam 23 thus gives the lens housing 25 and its contained lenses an oscillating horizontal movement.

The arm support 28 has an internally threaded opening through which the threaded rod 36 passes and meshes, the revolution of the rod 36 moving the lens housing 25 horizontally toward or away from the film 61.

The revoluble shaft 37 carries the fixedly attached helical gear 38 meshing with the helical gear 21. The shaft 37 carries also the fixedly attached shutter 39 capable of closing a lens exposure opening of the casing 100.

Fixedly attached to the shaft 15 is a helical gear 40 meshing with the helical gear 41 of the revoluble shaft 42. The shaft 42 carries also the fly-wheel 43.

A support composed of the two upright members 44.44, carries a slidable frame 45 having the upper and lower angle iron cross pieces 46 and 47. The shaft 42 carries a fixedly attached cam member 48 abutting upon the cross pieces 46 and 47. The revolution of the shaft 42 and the cam 48 will thus give the frame 45 a vertical reciprocating movement.

A shaft 49 is carried by a bearing in the frame 45 and the arm 50. Slidable upon the shaft 49 is a sleeve 51 carrying the spaced parallel guide members 52.52, within the space between which is the cam 53 fixedly attached to the shaft 42. The crossbar 52' carries the two outwardly extended film engaging pins 54.54.

It will thus be seen that the revolution of the shaft 42 will give a vertical movement and a forwardly and rearwardly horizontal movement to the frame 45, the pins 54.54 being moved forwardly to engage the perforations of a film, as shown later, the downward movement of the frame carrying the film downwardly and the inward movement of the pins 54.54 disengaging them from the film, the frame then moving upwardly while the film is at rest.

A film frame comprises the fixed frame 55 having the usual film opening 56 therein. Hingedly attached to the frame 55 at 57 is a gate frame 58 having an opening 59 therein, the gate frame 58 being held in closed position by means of the locking member 60. The frames 55 and 58 are spaced from each other to allow of the passage of the film 61 therethrough.

A padded compression plate 62 is affixed to the frame 55 by means of the screws 63.63, a spiral spring 64 resting between the plate 62 and the head 65 of each screw 63. The compression plate 62 thus tends to keep the film 61 in a curved stationary position during the photographing process.

A gear 66 meshes with the gear 22, the shaft 67 carrying the fixed gears 66 and 68, the latter meshing with the gear 69 of the sprocket shaft 70, the latter carrying the two sprocket wheels 71.71. Idlers 72, 73, 74.74 serve to support and abut upon the film 61 and to maintain it in movable position downwardly between the frames 55 and 58.

The operation of the device is as follows:—

The revolution of the handle 12 causes the revolution of the shaft 10, the gears 13 and 17, the shaft 15 and the cam cylinder 23. The movement of the pin 34 through the cam recess 24 gives a reciprocating movement to the arms 32 and 30 thus causing the lens housing 25 to have an oscillating movement. At the same time the revolution of the shaft 19 causes the gears 21 and 38 to revolve the shutter 39, thus opening and closing an aperture in the partition 75 of the casing 100. The revolution of the shaft 10 through the several co-acting parts as explained above causes the revolution of the cams 48 and 53 imparting successive horizontal and vertical movements to the film moving frame 45, while at the same time the shaft 67 and its co-acting parts cause a revolution of the sprocket shaft 70.

During the above movement operations, assuming that the shutter is open and the film is at rest, the lens housing has a horizontal movement in one direction, the lenses sweeping across the face of the film and making a photographic impression thereon. As soon as the lenses pass beyond the film face, the shutter revolves closing the light-aperture, while at the same time the pins of the film moving frame move toward the film and engage perforations thereof, as soon as this engagement takes place the film moving frame moving downwardly carrying the film with it. During the period in which the shutter is closed, the lens housing oscillates back to its original position. When the film is in place for the next picture the pins of the film moving frame move outwardly from the perforations, the frame moving upwardly for the next operation. At the same time the shutter opens and the lenses make a sweep across the face of the newly exposed portion of the film. Two successive photographic imprints have thus been impressed upon the film on adjacent parts thereof. The lenses may be focused upon the film by means of the shaft 36 as described.

It is not essential that the lenses return to their original position during the unexposed period, as they may operate during each of their separate oscillating movements, but I prefer the method shown in the accompanying drawings. By "curving the film vertically" I mean curving the vertical edges of the film inwardly toward each other presenting a concave face to the lens.

My device, therefore, presents an effective means whereby widescope motion pictures may be taken with standard lenses, the photographic imprints being made successively upon a single film.

I do not limit myself to the particular size, shape, number or arrangement of parts as shown and described as these are given simply as a means for clearly explaining my invention.

What I claim is:—

1. In a motion picture camera, in combination, a lens capable of horizontal oscillating movement upon its focal center, means for oscillating the lens in a horizontal plane, means for intermittently feeding a film in a vertical direction, means for curving the film in a vertical direction with the concave face toward the lens, and means for focusing the lens during its oscillating movement.

2. In a motion picture camera, in combination, a lens capable of horizontal oscillating movement upon its focal center, means for oscillating the lens in a horizontal plane, means for intermittently feeding a film in a vertical direction, means for curving the film in a vertical direction with the concave face toward the lens, and means for changing the focal distance of the lens during its movement with respect to the film.

3. In a motion picture camera, in combination, a lens housing capable of horizontal oscillating movement upon its focal center, means for oscillating said housing in a horizontal plane, a lens within said housing, means for intermittently feeding a film in a vertical direction, means for curving the film vertically with its concave face positioned toward the lens, a shutter, means for moving the shutter admitting light to the lens while the film is at rest and interrupting the light when the film is moving and means for focusing the lens during its oscillating movement.

4. In a motion picture camera, in combination a lens housing capable of horizontal oscillating movement upon its focal center, means for oscillating said housing in a horizontal plane, a lens within said housing, means for intermittently feeding a film in a vertical direction, means for curving the film vertically with its concave face positioned toward the lens, a shutter, means for moving the shutter admitting light to the lens while the film is at rest and interrupting the light when the film is moving and means for changing the focal distance of the lens during its movement with respect to the film.

5. In a motion picture camera, in combination, a lens housing capable of horizontal oscillating movement upon its focal center, a cam movement for oscillating the housing in a horizontal plane, a lens within the housing, means for intermittently feeding a film in a vertical direction, means for curving the film vertically with its concave face toward the lens, means whereby light will be admitted to the film during its rest period, means whereby the lense will move in one horizontal direction during the film rest period, means whereby the light will be interrupted during the film movement period and means for changing the focal distance of the lense with respect to the film.

6. In a motion picture camera, in combination, a lens capable of horizontal movement upon its focal center, means for oscillating said lens in a horizontal plane, means for intermittently feeding a film in a vertical direction, means for curving said film in a vertical direction with its concave face towards said lens and means for changing the focal distance of the lens with respect to the film.

7. In a motion picture camera adapted to produce photographic images transverse of a film, in combination, a lens capable of horizontal movement upon its focal center, means for oscillating said lens in a horizontal plane, means for intermittently feeding a film in a vertical direction, means for curving said film in a vertical direction with its concave face towards said lens and means for moving said lens and said film with respect to each other.

8. In a motion picture camera, in combination, a lens capable of horizontal movement upon its focal center, means for oscillating said lens in a horizontal plane, means for intermittently folding a film in a vertical direction, means for curving said film in a vertical direction with its concave face towards said lens, means for admitting light to the lens while the film is at rest and interrupting the light when the film is moving and means for changing the focal distance of the lens with respect to the film.

9. In a motion picture camera, in combination, a lens capable of horizontal movement upon its focal center, means for oscillating said lens in a horizontal plane, means for intermittently feeding a film in a vertical direction, means for curving said film in a vertical direction with its concave face towards said lens, means for admitting light to the lens while the film is at rest and interrupting the light when the film is moving and means for changing the focal distance of the lens with respect to the film.

10. In a motion picture camera, in combination, a lens housing capable of horizontal oscillating movement, a lens fixedly carried within said housing, means for oscillating said housing and said lens upon the focal center of said lens, means for intermittently feeding a film in a vertical direction, means for curving said film in a vertical direction with its concave face towards said lens, means for admitting light to the lens when the film is at rest and interrupting the light when the film is moving and means for changing the focal distance of the lens with respect to the film.

11. In a motion picture camera adapted to produce photographic images transverse of a film, in combination, a lens housing capable of horizontal oscillating movement, a lens fixedly carried within said housing, means for oscillating said housing and said lens upon the focal center of said lens, means for intermittently feeding a film in a vertical direction, means for curving said film in a vertical direction with its concave face towards said lens, means for admitting light to the lens when the film is at rest and interrupting the light when the film is moving and means for moving said lens and said film with respect to each other.

12. In a motion picture camera adapted to produce photographic images transverse of a film, in combination, a lens capable of horizontal movement upon its focal center, means for oscillating said lens in a horizontal plane, means for intermittently feeding a film in a vertical direction, means for curving said film in a vertical direction with its concave face towards said lens and means for admitting light to the lens while the film is at rest and interrupting the light where the film is moving.

13. In a motion picture camera adapted to produce photographic images transverse of a film, in combination, a lens housing capable of horizontal oscillating movement, a lens fixedly carried within said housing, means for oscillating said housing and said lens upon the focal center of said lens, means for intermittently feeding a film in a vertical direction, means for curving said films in a vertical direction with its concave face towards said lens, and means for admitting light to the lens when the film is at rest and interrupting the light when the film is moving.

Signed at New York city in the county of New York and State of New York, this 29th day of September, 1924.

WALTER J. McINNIS.